US012130830B1

(12) United States Patent
Caldwell, Jr. et al.

(10) Patent No.: US 12,130,830 B1
(45) Date of Patent: Oct. 29, 2024

(54) REAL-TIME INTELLIGENT FILTERING AND EXTRACTION OF MAINFRAME LOG DATA

(71) Applicant: BMC Software, Inc., Houston, TX (US)

(72) Inventors: Walter Fred Caldwell, Jr., Clear Lake Shores, TX (US); Robert Ward Blackhall, Katy, TX (US); Jason Ronald Torola, Katy, TX (US); John David O'Dowd, Houston, TX (US)

(73) Assignee: BMC Software, Inc., Houston, TX (US)

( * ) Notice: Subject to any disclaimer, the term of this patent is extended or adjusted under 35 U.S.C. 154(b) by 694 days.

(21) Appl. No.: 16/352,161

(22) Filed: Mar. 13, 2019

(51) Int. Cl.
*G06F 16/25* (2019.01)

(52) U.S. Cl.
CPC .......... *G06F 16/254* (2019.01); *G06F 16/258* (2019.01)

(58) Field of Classification Search
CPC .............................. G06F 16/254; G06F 16/258
USPC ......................................................... 707/602
See application file for complete search history.

(56) References Cited

U.S. PATENT DOCUMENTS

| | | | |
|---|---|---|---|
| 7,039,921 B2 | 5/2006 | Shah et al. | |
| 7,206,789 B2 | 4/2007 | Hurmiz et al. | |
| 7,653,633 B2 | 1/2010 | Villella et al. | |
| 7,920,851 B2 | 4/2011 | Moshir et al. | |
| 8,140,565 B2 * | 3/2012 | D'Angelo | G06F 16/9024 707/769 |
| 8,725,853 B2 * | 5/2014 | Sellers | H04L 41/0213 709/224 |
| 9,712,409 B2 * | 7/2017 | Sellers | H04L 41/069 |
| 9,767,171 B2 * | 9/2017 | Russell | G06F 40/16 |
| 9,934,265 B2 * | 4/2018 | Karandikar | G06F 16/215 |
| 10,713,271 B2 * | 7/2020 | Das | G06F 11/3476 |
| 10,949,422 B2 * | 3/2021 | Gatto | G06F 16/245 |
| 2005/0171937 A1 * | 8/2005 | Hughes | G06F 16/9014 |
| 2009/0070338 A1 | 3/2009 | Spitzig et al. | |
| 2014/0181438 A1 | 6/2014 | Varadharajan et al. | |
| 2014/0219101 A1 * | 8/2014 | Horovitz | H04L 63/1408 370/236 |
| 2016/0371489 A1 * | 12/2016 | Puri | G06F 16/254 |

OTHER PUBLICATIONS

BMC Datasheet, "AMI Data Extractor for IMS, Get real-time IMS analytics data", Aug. 2018, 2 pages.

* cited by examiner

*Primary Examiner* — Giovanna B Colan
(74) *Attorney, Agent, or Firm* — Brake Hughes Bellermann LLP

(57) ABSTRACT

Systems and methods are provided that extract information from IMS log records to reduce the amount of data transmitted and input to an analysis engine. An example method includes writing IMS log records matching log types identified in an extraction list to a file within an IMS control region of a mainframe computer and outside of the IMS control region, and reading records from the file. For each record read, the method may also include extracting fields of interest from the log record based on fields of interest associated with the log type of the log record in the extraction list and a data-to-field mapping for the log type, converting the fields of interest to a predetermined format based on the data-to-field mapping, and writing at least one field of interest to an output file. The method may also include transmitting the output file to an analytics engine for processing.

22 Claims, 10 Drawing Sheets

```
File Edit Options   Help
------------------------------------------------------------------------
Data Extractor           Extract List Edit - Records Types    Row 1 to 3 of 3
Command ===>                                                  Scroll ===> Page Extract List:  Test ⟵505
Title:        _____

Type one or more action codes.
To insert a new record type, type INSERT on the command line.
   X=Edit extract fields       F=Edit filters    D=Delete Record ⟵510                              Extract ⟵515
   A  Type   Description                       Fields      Filters ⟵520
   -- ----   -----------                       ------      -------
   |  01     MsgIn    IMS input message           6           1
   |  03     MsgOut   IMS output message          5           1
   |  16     Sign     Sign in or sign off         6           1
   |*************** Bottom of Data ********************************************
```

FIG. 5

```
File Edit Options    Help
------------------------------------------------------------------------
                      Insert Record Type           Row 1 to 14 of 17
D Command ===>                                     Scroll ===> Page
C
  Specify the record type to insert. Then press Enter.
E    Record type to insert ____  (Valid types are listed below)
T
T Record
T Type    Description
  ------  -----------
  01      MsgIn    IMS input message
  02      CmdI     Condensed command - Type 1
  03      MsgOut   IMS output message
A 04      RSR      Remote Site Recovery Tracking
| 07      ApplT    Application Terminate
| 08      ApplS    Application Start
| 09      Bstat    Buffering statistics
| 0F      LgLog    Logical logger
|* 10     Sviol    Security breach
  11      ConvS    Conversation Start
  16      Sign     Sign in or sign off
```

FIG. 6

```
File Edit Options   Help
----------------------------------------------------------------------
Data Extractor         Extract List Edit - Records Types   Row 1 to 4 of 4
Command ===>                                                Scroll ===> Page Extract List:  Test ⌒705
Record type:   03 - IMS output message ⌒710

The following fields will be extracted from this record type.
Type one or more action codes.
To insert a new extract field, type INSERT on the command line.
    D=Delete Field ⌒715
A   Name              Description              Type       Length
    ----              -----------              ----       ------
_   Msg_RacfUid       RACF userid              NAME        8
_   Msg_TimeStmp      Timestamp                TIMESTMP   19
_   Msg_NodeNmVtam    Node name if VTAM        NAME        8
_   Msg_DestCntNam    Destination CNT name     NAME        8
******************************* Bottom of Data *********************************
```

```
File Edit Options   Help
┌─────────────────────────────────────────────────────────────────────┐
│                    Insert Extract Fields          Row 1 to 14 of 16 │
│ Command ===>                                       Scroll ===> Page │
│                                                                     │
│ Select the fields to insert. Then press Enter.                      │
│                                                                     │
│   Field                                                             │
│ A Name          Description              Type                       │
│   ----------    ----------------------   -------                    │
│   LogRecLen     Log record length        INTEGER                    │
│   LogRecType    Log record type          HEX                        │
│   Msg_Cancl     Message cancelled        Y/N                        │
│   Msg_NodeVtam  Node name if VTAM        NAME                       │
│ A Msg_InCntNam  Input CNT name           NAME                       │
│   Msg_DestCntNam Destination CNT name    NAME                       │
│   Msg_MsfFormat MFS format name          NAME                       │
│   Msg_DestSysId Destination system id    INTEGER                    │
│   Msg_Uid       Userid                   STRING                     │
│ * Msg_RacfUid   RACF userid              NAME                       │
│                                                       ************  │
│                                                          of 3  Page │
└─────────────────────────────────────────────────────────────────────┘
                                     800

FIG. 8
```

```
File  Edit  Options    Help
─────────────────────────────────────────────────────────────────────────
Data Extractor            Extract List Edit - Filter Fields    Row 1 to 3 of 3
Command ===>                                                   Scroll ===> Page
 ─────────

Extract List:  Test ⌒905
Record type:   16 - Sign in or sign off ⌒910
Filter ID:     FILT2 ⌒930

This filter will be passed if ALL of the below conditions are true.
Type one or more action codes.
To insert a new extract field, type INSERT on the command line.
   S=Edit  D=Delete A    Field ⌒915   Comp ⌒920   Value ⌒925
     ──────       ────        ─────
|    SignOn       EQ          Y
|    SignOnUsr    NE          JOENIGHT
|    SignOnTime   LT          20181230060000000000
****************************** Bottom of Data ***********************************
```

```
File Edit Options   Help
─────────────────────────────────────────────────────────
                      Edit Filter Field                      of 4
Command ===>                                                 Page Specify the filter critera fo the field.
Field :    Msg_RacfUid
Type:      NAME Comparison operator.
  1.  EQ - Equal to
  2.  NE - Not equal to
  3.  GT - Greater than
  4.  GE - Greater than or equal to
  5.  LT - Less than
  6.  LE - Less than or equal to Comparison value JOECOOL (* and % allowed for EQ or NE)

Msg_NodeNmVtam   Node name if VTAM        NAME   8
   Msg_DestCntNam   Destination CNT name     NAME   8
 ******************************* Bottom of Data *******************************
```

FIG. 10

REAL-TIME INTELLIGENT FILTERING AND EXTRACTION OF MAINFRAME LOG DATA

BACKGROUND

International Business Machine Corporation (IBM) mainframes provide online transaction processing subsystems, such as Information Management System (IMS®) and Customer Information Control System (CICS®) (IMS and CICS are registered trademarks of IBM), that enable high-speed transaction processing of data. The various subsystems often generate log records during transaction processing. The primary purpose of many log records is for backup and recovery.

For example, an IMS subsystem receives transaction requests, which are processed by the IMS Control Region program. During this process the application specific program is executed and database information accessed or written and a response returned to the originator of the transaction. During processing of the transactions, the IMS Control Region writes records to a log to keep track on work performed in the IMS system. This process has been finely tuned over many years to focus on speed of processing and system integrity. Various types of log records are created to process different functions, such as security log records to record when security was validated, transaction and program execution records to indicate what was processed, database records to indicate a database update or change. As the log records generated by the IMS subsystem exist primarily for recovery, backup, and auditing purposes, the log records are not intended for other non-system uses and are formatted in a way that makes accessing much of this data difficult. For example, the log records can have cryptic contents (e.g., single byte binary, single or half-word binary, packed decimal, etc.) with tens or hundreds of different fields in variable length records. In some types of log records the location of the same field may vary from record to record. Moreover, because the log records are not intended for non-system uses, the content of individual log records is not well documented.

SUMMARY

Systems and methods provide a user interface that enables a user to distill the information in a lengthy log record down to just those fields the user requires for analysis in a manner that minimizes the overhead to the mainframe subsystem generating the log records and minimizes computer resources needed to transmit the required information. Mainframe subsystem log records, such as IMS log records can be lengthy, with 40, 50, or even of hundreds of fields per log record. Implementations perform dual-phase extraction. The first phase takes place in the address space where the mainframe subsystem executes. The first phase extracts log records that match a log record type identified in an extraction list. These log records are passed to a second phase extraction. The second phase extraction takes place outside of the address space where the first phase occurs. The second phase extracts discrete fields of the log record according to an extract list. The extract list includes, for each log record type, at least one extract field. The extract list may also include one or more filter elements for a log record type, although such filter elements are optional. A field that is used in a filter element or identified as an extract field is a field of interest for the log record type. The extract list is populated via a user interface, which enables a user to quickly and easily select log record types of interest, set up filter elements for the log record type selected, and indicate extract fields. Log record types added to the extract list can be dynamically incorporated into the first phase extraction.

In the second phase, which takes place in an address space outside of the mainframe subsystem control region, the system processes the records passed to it by the first phase and extracts only those fields from the log record that are either filter fields or extract fields. Both filter fields and extract fields are defined in the extract list. Filter fields are associated with a filter element. The filter element includes at least one comparison operation applying a comparison operator to the filter field and a comparison value. Filter elements that have multiple comparison operations are conjunctive; in other words, all comparison operations must pass (evaluate to TRUE) for the filter element to pass. The filter elements of a log record type with multiple filter elements are disjunctive; in other words, only one of the filter elements needs to pass for the system to write the extract fields to the output file. The second phase greatly reduces the information transmitted and ingested by analytics engines, reducing transmission time and processing costs.

One or more of the implementations of the subject matter described herein can be implemented so as to realize one or more of the following advantages. As one example, implementations enable the extraction of information from IMS log records in real-time while minimizing overhead in the mainframe subsystem address space, e.g., IMS control region or the IMS connect control region. Because many mainframe subsystems, particularly IMS subsystems, are expected to operate at high speed and with high reliability, implementations perform as few operations as possible within the control region during the first phase, limiting the impact to the performance of the IMS subsystem. Accordingly, processing of the log records in the IMS control region is limited to looking at log record type, and in some implementations, subtype. The log record types of interest, which can include subtypes, are those identified in the extraction list. In some implementations, overhead processing costs are further minimized by loading an in-memory table with the log record types of interest. This in-memory lookup makes selection of log records for extraction even faster. Extracting only those log records matching the log record types (and in some implementations, subtypes) identified in the table also reduces the amount of data transmitted to another address space, e.g., via a buffer.

Some implementations provide a more efficient process of accessing the log records in real time. While IBM provides a provides a common Log Exit capability that can be used to access log records at write time, this Log Exit capability adds overhead that can cause perceptible delay in the IMS system. While such capability can be used in some implementations, other implementations may use an intercept method that address the overhead and time delay issues. Implementations using the intercept method intercept the log buffer processing at a point where the IMS subsystem has written its buffer and is in 64-bit processing mode. Intercepting the process at this point enables some implementations to use a pre-allocated set of 64-bit addressed areas of shared storage and immediately execute the first phase extraction in 64-bit addressing mode and copy specific buffers to storage shared with the second phase extraction address space without the need to perform expensive mode switch operations. This allows implementations to perform the log record capture in a very fast and low impact way, as changing addressing modes each time a log record is written incurs overhead and slows processing.

As another example, more complex processing on the log records occurs outside the IMS control region, which minimizes the impact to the mainframe subsystem, but enables fine-tuned filtering and extraction of the data in the log records at a granular level. In particular, log records, which typically have 40, 50, or even 200 different fields in each record, can be distilled down to only a few fields. Moreover, implementations can enable a user to extract data that is based on inspection of multiple fields. In some implementations, real-time processing may be achieved by processing the real-time created 64-bit addressed buffers immediately in the second phase in the address space external to the IMS Control Region.

As another example, implementations dramatically reduce the amount of data provided to an analytics processing engine. Accordingly, implementations reduce the amount of data transmitted to the analytics processing engine from the mainframe, which reduces transmission time and costs. Furthermore, as many analytics processing engines base the use of their services on the amount of data ingested, implementations can dramatically reduce the computing resources consumed in the ingestion process. Moreover, the data in the output file provided to the analytics processing engine is normalized, which further reduces computing resources consumed by ingestion. Reducing computing resources consumed in turn reduces the outlay for using the service, making the technical solution provided by implementations desirable to users.

In addition, the output file generated by disclosed implementations makes it possible for this log data to be included in the analytics. Because the content of many mainframe log files is cryptic, i.e., intended for use by a mainframe subsystem, not outside of such systems, not well documented, and not easily extracted, the data represented by mainframe log records has not been included in any kind of analytics processing. EBCDIC encoding of the mainframe log data, rather than ASCII encoding, represents another barrier to inclusion into many analytic processing engines. And, processing EBCDIC data as ASCII results in some fields losing their value. Accordingly, implementations normalize the data, making ingestion of the information in the mainframe logs accessible. Implementations provide a user-friendly interface that makes it easy to select the kind of information to extract and to filter the information to just those fields of interest for analytics. The user-friendly interface enables users to add the information in the IMS log files to other sources of information, such as Internet-based sources, to improve the quality of the analytics.

Other features will be apparent from the description and drawings, and from the claims.

BRIEF DESCRIPTION OF THE DRAWINGS

FIGS. 5 to 10 illustrate example user interfaces used to populate an extraction list used in the first phase and the second phase of log extraction, according to an implementation.

DETAILED DESCRIPTION

Disclosed implementations provide a two-phase method of extracting information from log records that minimizes disruption to the executing subsystem and reduces computing resources needed to transmit the log information and ingest the log information into an analytics processing engine. Implementations include a user interface that enables a user to dynamically select the types of log records that will be extracted in the first phase and to select particular fields of interest from the selected log record types. The fields of interest can be used to filter and/or extract data from the log record. As log records are conventionally meant for use in system recovery, the log records tend to be lengthy and difficult for a human user to parse. In other words, the log records have a system-friendly format, but not a user-friendly format. Because of this, the full breadth of information included in the log records has seen limited use in commercial analytics processors, such as Splunk® by Splunk Inc., ArkAngel by Ark Analytics, Logstash® by Elasticsearch BV®, Hadoop® and Spark® by Apache, TrueSight® by BMC Software, Inc., Spotfire® by TIBCO, etc. Disclosed implementations provide access to discrete data items and dramatically reduce the amount of data transmitted to and ingested by such analytics processing engines.

Figure 1:
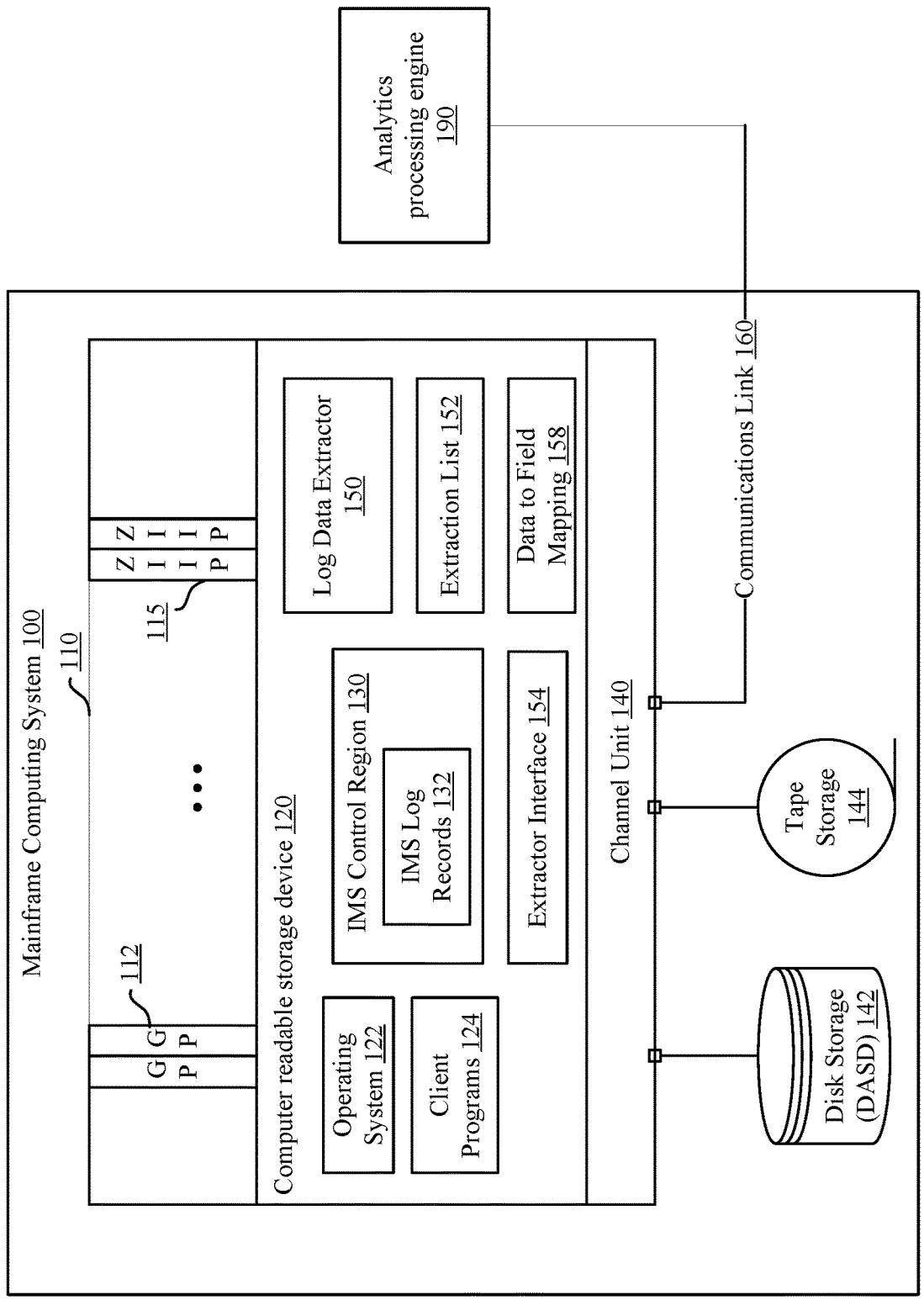
FIG. 1 is a block diagram that illustrates an exemplary mainframe system, in accordance with some implementations.

FIG. 1 illustrates a high-level block diagram of a mainframe system 100, in accordance with disclosed implementations. Mainframe computers are large, multi-processor computing devices able to perform thousands of tasks every second. Because of their large size and processing power, computing resources are tracked and customers are billed based on their processor usage. In some implementations, system 100 can be an LPAR. An LPAR is a logical segmentation of a mainframe's memory and other resources that allows it to run its own copy of an operating system and associated applications, making the LPAR, in practice, equivalent to a separate mainframe. LPARs may be enabled via special hardware circuits or purely through software. A system administrator can assign one or more system processors for the exclusive use of an LPAR. Alternately, the administrator can allow all processors to be used on some or all LPARs. LPARs may also allow multiple system images (of the same operating system or different operating systems) to run in one machine. Furthermore, each LPAR can execute one or more subsystems within an operating system. A sysplex is a collection of LPARs that cooperate to process work. In some implementations the system 100 may be an LPAR or an LPAR in a sysplex. LPARs in a sysplex can communicate with each other without a CICS control region using Cross-system Coupling Facility ("XCF") communications. Thus, although referred to as mainframe computing system 100, it is to be understood that mainframe computing system 100 may be logical partitions of a single physical mainframe computer.

The mainframe computing system 100 can include one or more processors configured to execute one or more machine executable instructions or pieces of software, firmware, or a combination thereof. In some implementations, a processor frame, such as frame 110, may include a plurality of General Processors (GPs) 112. In some implementations, the processor frame 110 may include specialty processors, such as IBM zSeries® Integrated Information Processors (zIIPs) 115.

The mainframe computing system 100 may also include one or more computer readable storage devices, such as device 120. The computer readable storage device 120 may include main memory, cache, or disk storage, configured to store data and/or applications, either temporarily, permanently, semi-permanently, or a combination thereof. The storage device 120 may include volatile memory, non-volatile memory, or a combination thereof. The mainframe computing system 100 can include an operating system, such as operating system 122. The operating system can be the z/OS operating system or some other mainframe operating system. The mainframe computing system 100 may include one or more client programs 124. Client programs 124 may include any code written to execute on the mainframe computing system 100. For example, client programs 124 may include mainframe subsystems, such as CICS and Resource Access Control Facility (RACF), vendor-supplied business application programs, batch programs, and other proprietary programs. The operating system 122 may run all workloads on the GPs, but may only run certain workloads on the specialty processors, if such processors exist. The operating system 122 may assign workload generated by client programs 124 to the processors.

The mainframe computing system 100 may also include other mainframe transaction-based subsystems, such as IMS Control Region 130 running an IMS subsystem. The IMS Control Region 130 is a range of virtual addresses that the operating system 122 assigns to the IMS subsystem. The IMS Control Region 130 can also be referred to as the IMS address space. While FIG. 1 uses an IMS subsystem for ease of explanation, implementations include other similar subsystems, including IMS Connect, etc. In some implementations, the IMS subsystem may be part of an IMS data sharing group that has access to the same set of IMS databases. The client programs 124 may make requests to the IMS subsystem. The requests can be referred to as transactions or messages. The IMS subsystem processes the request and provides a response.

When a request is received by the IMS subsystem it is processed by the IMS Control Region program. During processing of the request, the IMS Control Region 130 writes records to a log, e.g., IMS Log records 132, to keep track on work performed in the IMS subsystem. This process has been finely tuned over many years to focus on speed of processing and system integrity. Various types of log records are created in the IMS log records 132 to process different functions, such as security log records to record when security was validated, transaction and program execution records to indicate what was processed, database records to indicate a database update or change, etc. The log records generated by the IMS subsystem exist primarily for recovery, backup, and auditing purposes. Log records 132 are not intended for other non-system uses and are formatted in a way that makes accessing much of this data difficult. For example, because the primary purpose of the log records is for system recovery, the log records have cryptic contents (e.g., single-byte binary, single-word or half-word binary, packed decimal, etc.) with tens or hundreds of fields and variable length records. As another example, the same type of data, e.g., an integer or a date, can be stored in a number of different formats. In some types of log records, the location of the same field may vary from record to record. Moreover, because the log records 132 are not intended for non-system uses, the content of individual log records is not well documented. Existing use of IMS log records 132 lacks flexible filtering, does not allow access to discrete data elements, and does not adequately reduce the amount of data transmitted to and ingested by an analytics processing engine.

Implementations may include a log data extractor 150. The log data extractor 150 runs in an address space outside of the IMS control region 130. Although illustrated as running on the mainframe computing system 100, in some implementations, the log data extractor 150 may run on a different computing system in communication with the mainframe computing system 100. The log data extractor 150 is configured to process and filter log records selected during a first phase of extraction. During the first phase, log records from IMS log records 132 are selected and written to a file. The log records are selected by log type. In some implementations, log records of a particular type may be further selected by subtype. No other processing, beyond writing selected log records 132 to a file is performed in the first phase. In some implementations, the first phase is executed by a component of the log data extractor 150 configured to run in the IMS control region 130. This minimizes disruption to the IMS control region 130. Only log record types (and in some instances, subtypes) included in an extraction list 152 are extracted from the IMS log records 132. The extraction list 152 is populated by an extractor user interface 154.

The log data extractor 150 reads the records from the file. In some implementations, the file may be one or more buffers. In some implementations, the file may be a queue. For each record read, the log data extractor 150 determines the log record type of the log record. The log data extractor 150 uses the extraction list 152 to determine which fields are of interest for that log record type. The fields of interest are fields used in a filter element for the log record type in the extract list 152 or are fields identified as an extract field for the log record type in the extraction list 152. Once the fields of interest are identified, the log data extractor 150 extracts the fields of interest from the log record and normalizes the field values. A field refers to a specific data item. The data item has a name, e.g., a field name, and a value, e.g., a field value. The field value is what is extracted from the log record. The field name is used by the user to identify the data item of interest. The term field, as used herein, can refer to the field name, the field value, or both, depending on context.

The log data extractor may use a data to field mapping 158 to determine how to extract fields from the log record based on the type of the log record. The log data extractor may use the data to field mapping 158 to normalize the fields. The data to field mapping 158 includes, for each type of log record, what fields are available, including a name and short description, where those fields occur in the log record, what data format the field has, how to normalize the field, what the normalized type or pre-determined type of the field will be after extraction, and the length of the field after extraction. Some fields in the data to field mapping 158 may be converted fields. A converted field does not exist in the log record; rather the converted field is calculated based on the evaluation of two or more fields that exist in the log record. For example, FIELDA may have a value of 'Y' or 'N' depending on the values of FIELDX, FIELDY, and FIELDZ in the log record. Thus, normalization of a converted field is understood to include evaluation of the fields that the converted field depends on. The field mapping can be generated from a z/OS® assembler code listing of the IMS Log record expansion of the ILOGREC RECID=nn macro DSECT, where nn is the log record type. General descriptions of the log record types can be found in the IBM IMS Diagnosis manual in Chapter 18 SYS—Service Aids (GC27-6786-00).

The log data extractor 150 applies the filter elements, if any, to the log record. If at least one filter element passes, the log data extractor 150 writes the extract fields to an output file. The system 100 may transmit the output file to the analytics processing engine 190. In some implementations, the system 100 transmits the extract fields to another system and the other system writes the output file. In some implementations, the system 100 transmits the extract fields directly to the analytics processing engine 190 for processing. For ease of discussion, as used herein, writing the extract fields to an output file covers all these implementations. The output file includes the value of each extract field identified for the log type of the record. In some implementations, the output file may be in key-value pairs. In some implementations, the output file may have a JSON format, an XML format or other self-describing data format. Implementations are not limited to a particular format in the output file.

The analytics processing engine 190 is configured to ingest large amounts of data and provide analysis based on the ingestion. The analytics processing engine 190 may represent any known or later-developed analytics processor. In some implementations, the analytics processing engine 190 may be executing on the mainframe 100. Non-limiting examples of analytics processing engines 190 that execute on the mainframe include Spotfire and Spark. In such implementations, the output file may be stored in disk storage device 142 and accessed from the analytics processing engine 190. The analytics processing engine 190 may also be a non-mainframe application. In such implementations, the system 100 may transmit the output file to the computing system that is executing the analytics processing engine 190. Non-limiting examples of non-mainframe analytics processing engine include TrueSight, Splunk, ArkAngel, ELK Stack, and Hadoop. The analytics processing engine 190 is configured to combine data from multiple sources for a customer. Thus, by using disclosed implementations, customers can easily combine mainframe data with web data. Conventionally, this process has been difficult and little used because of the differences between mainframe and web-based data, e.g. EBCDIC encoding rather than ASCII encoding, the high resource consumption associated with ingesting a full mainframe log record, etc.

The mainframe computing system 100 may also include an extractor user interface 154. The extractor user interface 154 enables a user to populate the extraction list 152. The extractor user interface 154 uses information from the data to field mapping 158 to present log record types to the user for selection and, for each log record type, the fields available for extraction, for filtering, or both. Thus, users using the extractor user interface 154 can easily identify, at a granular level, the information to be included in the final extract of the log records. The extractor user interface 154 enables generation of filter elements for a log record type. A filter element is optional. A filter element includes at least one comparison operation performed on a log field and a comparison value. For example, a filter element can compare a date field to a given date. The comparison operator can be one of equal to, not equal to, greater than, greater than or equal to, less than, or less than or equal to. When a filter element has more than one comparison operation, the result is a conjunction of the operations. In other words, for a filter element to pass, i.e., resolve to TRUE, all comparison operations for that filter element must pass. A log record type can have multiple filter elements. When multiple filter elements exist for a log record type, the result is disjunctive. In other words, if any one of the filter elements pass, the filter for the log record is passed, and the log record is extracted. Only when no filter elements pass is the log record discarded. The filter elements enable a user to eliminate log records that are not wanted or not useful for further analysis. Eliminating such log records entirely limits the data transmitted to the analytics engine and ingested by the analytics processing engine 190. As most commercial analytics engines charge by the megabyte for ingestion, limiting the data transmitted and ingested results in faster transmission times and savings to the user.

The extractor user interface 154 also enables selection of extract fields. Extract fields are those fields that are actually included in the data provided to the analytics processing engine 190. Extract fields can be the same as fields used in one or more filter elements. Extract fields need not be included in any filter element. By enabling the user to select extract fields, implementations allow the user to select data at a highly granular level. Because log records are used primarily for system recovery they include a large amount of data not of interest to the user. For example, log records typically have between 40 and 200 different fields. Selecting only the five or six fields considered of value to the user enables the user to further reduce the amount of data transmitted to and ingested by a commercial analytics processing engine 190. Examples of the extractor user interface 154 are provided with regard to FIGS. 5 to 10 below.

In some implementations, the mainframe computing system 100 may also include a channel unit, such as channel unit 140, for processing Input/Output (I/O) requests. The channel unit 140 may include a communications link 160, which may be a telecommunications link, a network interface, a communication bus, or some other communication link. For example, mainframe computing system 100 may communicate with other computing systems using XCF, TCP/IP, SNA, or other communication protocols over communications link 160. The channel unit 140 may also include a tape storage unit 144 and/or a disk storage device 142 sometimes referred to as a Direct Access Storage Device (DASD). In some implementations, mainframe computing system 100 may include one or more other hardware components not shown in FIG. 1, such as for example, a display or monitor, a keyboard, a touchscreen, a camera, a mouse, a touchpad, a trackpad, a video processor, etc., through which a user may send data to and receive data from mainframe computing system 100, e.g., the extractor user interface 154. In some implementations, the user may use a second computing device (not shown) in communication with mainframe computing system 100 via a communications network to send data to and receive data from mainframe computing system 100.

Figure 2:
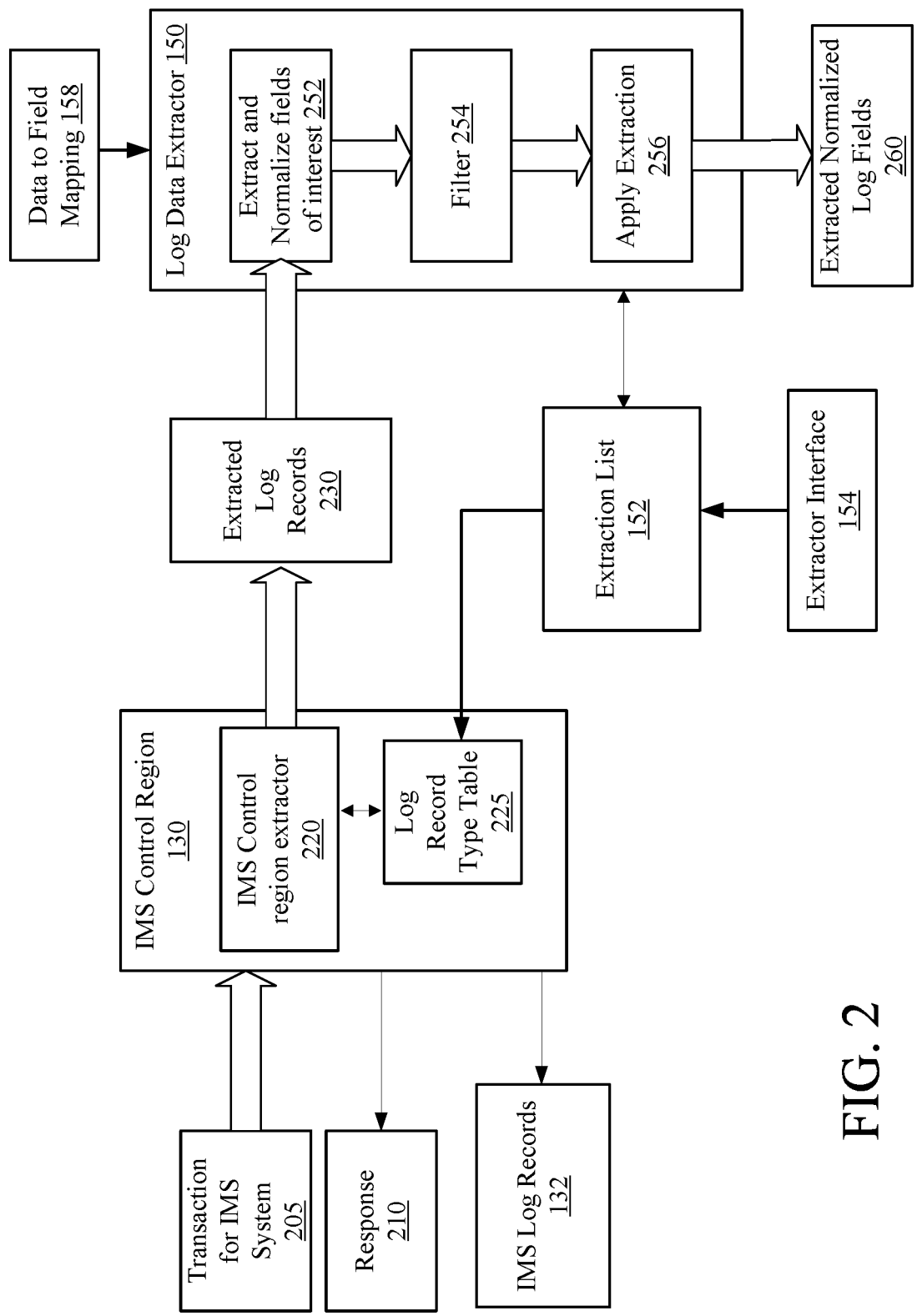
FIG. 2 is a block diagram illustrating example data flow and modules within the mainframe system of FIG. 1, in accordance with some implementations.

FIG. 2 is a block diagram illustrating example data flow using modules within the mainframe system of FIG. 1, in accordance with some implementations. In the example of FIG. 2, the client program has requested a transaction 205. The transaction 205 is sent to the IMS subsystem executing in IMS control region 130. The IMS control region 130 receives the transaction 205 and processes it, e.g., generating a response 210. The response goes back to the requesting program. As part of processing the transaction, the IMS logger of the IMS control region 130 writes one or more IMS log records 132. This process occurs in conventional systems.

Implementations add an IMS component of the log data extractor 150. The IMS component, e.g., IMS control region extractor 220, runs in the IMS control region 130. In some implementations, the IMS control region extractor 220 reads records from the IMS log records 132. In some implementations, log records are read as they are written or soon after they are written. In some implementations, the IMS control region extractor 220 may use established exit points, such as the Log-Write user Exit provided by IBM. Implementations that use the Log Write user Exit may incur overhead from address space switching, establishing a special environment for each invocation of the Log Write exit, and/or may not have access to some IMS Control Blocks and IMS functional constructs.

In some implementations, the IMS control region extractor 220 intercepts the IMS log records to enable real-time extraction. In such implementations, a system administrator may modify the IMS Control Region JCL to install a front-end library ahead of the regular IMS Resident library. This front-end library contains an alias for the IMS region controller, DFSMVRC0. This alias performs some setup work before transferring control to the real, IMS version of DFSMVRC0. The setup work can include a number of operations. For example, a first operation is to determine whether a reference to the IMS control region extractor 220 is included in the IMS Control region //STEPLIB concatenation, and whether a module containing operational option (parameter) information is available to process. If this is true, the alias for the IMS region controller may transfer control to the IMS control region extractor 220 to execute an IMS setup routine for further setup processing. The IMS control region extractor 220's IMS setup routine loads and patches the IMS Log initialization module, DFSXLGI0, to cause it to take additional actions during IMS initialization. Once this patch is in place, control returns to the alias and, ultimately, DFSMVRC0 for normal IMS initialization.

Once normal IMS initialization is begun, the IMS subsystem uses the patched DFSXLGI0 module to initialize the logging environment. In addition to regular IMS activity, the patch (added by the IMS setup routine initiated by the alias) executes and initializes the IMS control region extractor 220 for log processing, then further patches IMS module DFSFDLB0 to call the IMS control region extractor 220 for IMS log processing routine. The DFSFDLB0 is patched to call the IMS control region extractor 220's IMS log processing routine each time a log buffer is scheduled to be written to disk storage. Thus, the IMS control region extractor 220 intercepts the IMS subsystem log write operation and executes within that operation. To reduce overhead caused by switching addressing modes, the latter patch may be placed at a point where the IMS logger is already in 64-bit processing mode, so the IMS control region extractor 220 is entered and returns in the 64-bit mode. By intercepting the IMS subsystem log record write operation, i.e., outside the provided exit point, all the IMS control blocks, constructs, and internal functions are available to the IMS control region extractor 220. This provides the IMS control region extractor 220 with access to information operating modes and settings. Additionally, the IMS control region extractor 220 runs at a point where the IMS logger is running in 64-bit addressing mode so the IMS control region extractor 220 avoids the overhead of switching addressing modes for each buffer of records processed.

For each log record written, the IMS control region extractor 220 may determine whether the log record has a log type that matches one of the log types of interest. The log types of interest are those identified in the extraction list 152.

In some implementations, the system, e.g., the log data extractor 150, may build an in-memory table 225 of the log record types of interest. The table 225 may include one entry for each unique log record type in the extract list 152. For example, the system may generate a compact, efficient tabular representation of the log record types to be collected. The log data extractor 150 may generate the table 255 by running through the records in the extraction list 152 and saving each unique log record type in the table. Some log record types may have subtypes. In some implementations, the extraction list 152 may also identify which subtypes are of interest. The location of some fields in the log record may depend on the subtype of the log record. In some implementations, the log data extractor 150 may save a combination of a log record type and a subtype in the table 225. This may occur when the extraction list 152 includes at least one record that identifies both a log record type and subtype. In some implementations, the log data extractor 150 may publish the table 255 to the IMS control region 130 via a memory interface. For example, the system may create a memory control block in the IMS control region in common memory storage and the log data extractor 150 is able to access this memory storage area to publish the table 225. The log record type table 225 enables fast access to the log record types of interest so that the IMS control region extractor 220 can minimize overhead, resulting in as little disruption to the IMS control region 130 as possible.

The IMS control region extractor 220 uses the table 225 to make quick decisions about whether a particular log record passes the first extraction phase. A log record passes the first extraction phase when it is of a log record type of interest. The IMS log records 132 each have a one-byte code at the beginning of the record to indicate the log record type. The IMS control region extractor 220 compares this code to the entries in the table 225. If a log record has a log record type of interest, e.g., a code matching an entry in the table 225, the log record passes the first extraction and is written to a location of extracted log records 230. If the log record type has an associated subtype, the log record passes the first extraction phase when the log record type code and subtype matches an entry in the table. When present, the subtype code appears after the log record type code in the log record. The first phase extraction, performed by the IMS control region extractor 220, occurs with as little processing as possible to minimize the impact on the IMS control region 130 and related online systems. More complex filtering and extraction occurs in a second phase, outside of the IMS control region 130. In some implementations, the IMS control region extractor 220 may collect and maintain certain statistics to monitor and evaluate the performance. For example, performance statistics may include, but are not limited to, the number of IMS buffers allocated, the number of IMS buffers available, the number of times there was no buffer available, the average microseconds it took to add records to the buffer, the number of times the log data extractor was signaled, etc. Such statistics can enable the system and/or a user to monitor the overhead that the IMS control region extractor 220 adds to the IMS control region.

The extracted log records 230 may be stored in a number of ways. In one example, the extracted log records 230 may be stored in a series of buffers. For example, the extracted log records 230 may be stored in a series of 64-bit buffers. In such an implementation, the IMS control region extractor 220 writes log records that pass the first phase extraction to an open buffer and when the buffer fills up, the IMS control region extractor 220 may close the buffer and open a new buffer. The log data extractor 150 may process buffers as they become available. A buffer becomes available when it is full, or in other words has reached its allocated size maximum. Implementations are not limited to a buffer of any particular size. The extracted log records 230 may be in a queue. For example, the IMS control region extractor 220 may write records to a queue, and the log data extractor may read records from the queue. The queue and buffer are provided as examples only and other methods of passing extracted log records 230 from the IMS control region 130 to the log data extractor 150 may be used.

The log data extractor 150 processes each extracted log record in turn. For ease of explanation, a record read from the extracted log records 230 by the log data extractor 150 for processing is referred to as an input record. Thus, an input record has passed the first phase extraction. The log data extractor 150 first determines which fields are of interest for the input record. The fields of interest are those fields that are either filter fields or extract fields in the extraction list 152 for the log record type of the input record. In some implementations, the log data extractor 150 may read the extraction list 152 to determine fields of interest. In some implementations, the log data extractor 150 may generate a more memory-efficient method to access the extraction list 152, such as an in-memory linked list. For example, a linked list may include a log type record, which links to the next log type record and to a list of filter elements and a list of extract fields. Such a list can be traversed quickly and efficiently. As another example, an in-memory array may use the log type code as an index, with a list of filter fields and extract fields. In any scenario, the log data extractor 150 determines the log record type of the input record and the fields of interest for that log record type based on the extraction list 152.

The log data extractor 150 then uses the data to field mapping 158 to find the fields of interest in the input record. The data to field mapping 158 includes, for each log record type (or log record type and subtype), the fields available in the log record. For each available field, the data to field mapping 158 includes information for extracting and normalizing the field. For some fields, the data to field mapping 158 may indicate where in the log record the field starts. For some fields, the data to field mapping 158 may indicate how to determine where the field starts. For some fields, e.g., converted fields, the data to field mapping 158 may indicate on which other fields the value is dependent and how to determine the value of the field from the value of other fields. In some implementations, the log data extractor 150 may include instructions for determining the value of a field from other fields and the position of a field in a particular type of log record. The data to field mapping 158 may also include the field name of each field. The data to field mapping 158 may also include a short description of each field. The data to field mapping 158 may additionally include an indication of how to normalize the field. In some implementations, the log data extractor 150 may include instructions for normalizing a particular field. Log records, especially IMS log records can have very different formats for the same type of data. For example, the number 13 could be stored as single-byte binary (e.g., x'0D'), a half-word binary (e.g., x'000D'), a full-word binary (e.g., x'0000000D'), a packed decimal (e.g., x'00013C') or as a character (e.g., x'F1F3'), depending on the log record type and field. Similarly, dates and times can be recorded in a variety of formats. Normalization converts disparate formats into one pre-defined format for each type of data. As one example, implementation may include some or all of the following predefined formats:

| | |
|---|---|
| NAME | Up to 8 alphanumeric characters (A-Z,#,$,@,0-9), the first character may not be numeric. |
| INTEGER | Contains numeric characters 0-9. |
| SIGNINT | Contains numeric characters, 0-9, and optionally a sign as the first character (+,−). |
| TIMESTMP | A numeric timestamp in the format YYYYDDDHHMMSSthmiju, where: YYYY is the year DDD is the day of the year (001-366) HH is the hour (00-23) MM is the minute (00-59) SS is the seconds (00-59) thmiju is microseconds(000000-999999) |
| DATE | A numeric date in the format YYYYDDD, where: YYYY is the year DDD is the day of the year (001-366) |
| TIME | A numeric time in the format HHMMSSthmiju, where: HH is the hour (00-23) MM is the minute (00-59) SS is the seconds (00-59) thmiju is microseconds(000000-999999) |
| HEX | Hexadecimal characters (0-9,A-F) |
| STRING | Any characters |
| Y/N | A single character, either Y (for yes or true) or N (for no or false). |

The log data extractor 150 extracts and normalizes the fields of interest (252) based on the data to field mapping 158. Once normalized, the log data extractor 150 applies the filter elements (254). Filter elements are optional. If a filter element exists, then the input record must pass the filter element or it is discarded. If more than one filter element exists, the input record must pass at least one filter element or the input record is discarded. A filter element includes at least one filter field and a comparison operation performed on the filter field and a comparison value. The filter field value is compared to the comparison value using the operator. If the comparison is successful, i.e., evaluates to TRUE, the input record passes the filter. If any particular filter element includes more than one comparison operation, all comparison operations that are part of that filter element must pass for the filter element to pass.

For input records without filter elements, or for input records that pass at least one of their filter elements, the log data extractor 150 extracts just those fields identified as extract fields for the log record type (256) and writes those fields to the extracted normalized log fields 260. A record in the extracted normalized log fields 260 has significantly less data than (reduced in size compared to) the corresponding input record. For example, an input record can be often be reduced by up to 90%. Frequently only one or two fields of a log record are pertinent to extraction needs for analysis.

The extraction list 152 is generated via an extractor user interface 154. The extractor user interface 154 uses the data to field mapping 158 to help a user build each list in the extraction list 152. The extraction list 152 may include one or more lists. In other words, the extraction list 152 may include a list generated by one user and another list generated by a second user. The lists may be differentiated by an identifier, e.g., a name or a code. Each list may include one or more log record types. Each list can be for different users, for different analytic engines, for different mainframe subsystems, etc. Each list may have a respective extracted normalized log fields 260 file, which includes only data that passes the first and second phases for log records in a particular list. In some implementations, the extractor user interface 154 may display statistics relating to operation of the first phase of extraction, e.g., generated by the IMS control region extractor 220.

Each log record type in a list may include zero to many filter elements. Each log record type includes one or more extract fields. Each filter element may include one or more comparison operations. Each comparison operation includes a filter field, an operator, and a comparison value. The comparison operations are conjunctive. In other words, each comparison operation in a filter element must evaluate to TRUE for the filter element to pass. The filter elements are disjunctive. In other words, only one filter element needs to evaluate to TRUE for the input record to pass the filter 254. In some implementations, the list may be given a type indicating the type of log record being extracted. In some implementations, the extract list 152 may be stored in an XML document format. As one example, the extract list may have the format:

```
<LIST TYPE="IMS" NAME="TEST">
    <RECORD TYPE="logcode">
        <FILTER ID="filtername">
            <FIELD ID="fieldname"
            COMP="operator" VALUE="compvalue"/>
            <FIELD ID="fieldname"
            COMP="operator" VALUE="compvalue"/>
        </FILTER>
        <EXTRACT>
            <FIELD ID="fieldname"/>
            <FIELD ID="fieldname"/>
        </EXTRACT>
    </RECORD>
</LIST>
```

Of course, implementations are not limited to an extraction list 152 in an XML document format, and the information described herein can be stored in other ways. In some implementations, as the user updates the record types, e.g., adds or deletes log record types, in the extraction list, the system may reflect those updates in the in-memory table 225 or otherwise make the update dynamically available to the IMS control region extractor 220. Thus, changes to the log record types of interest can be accommodated in real time.

Figure 3:
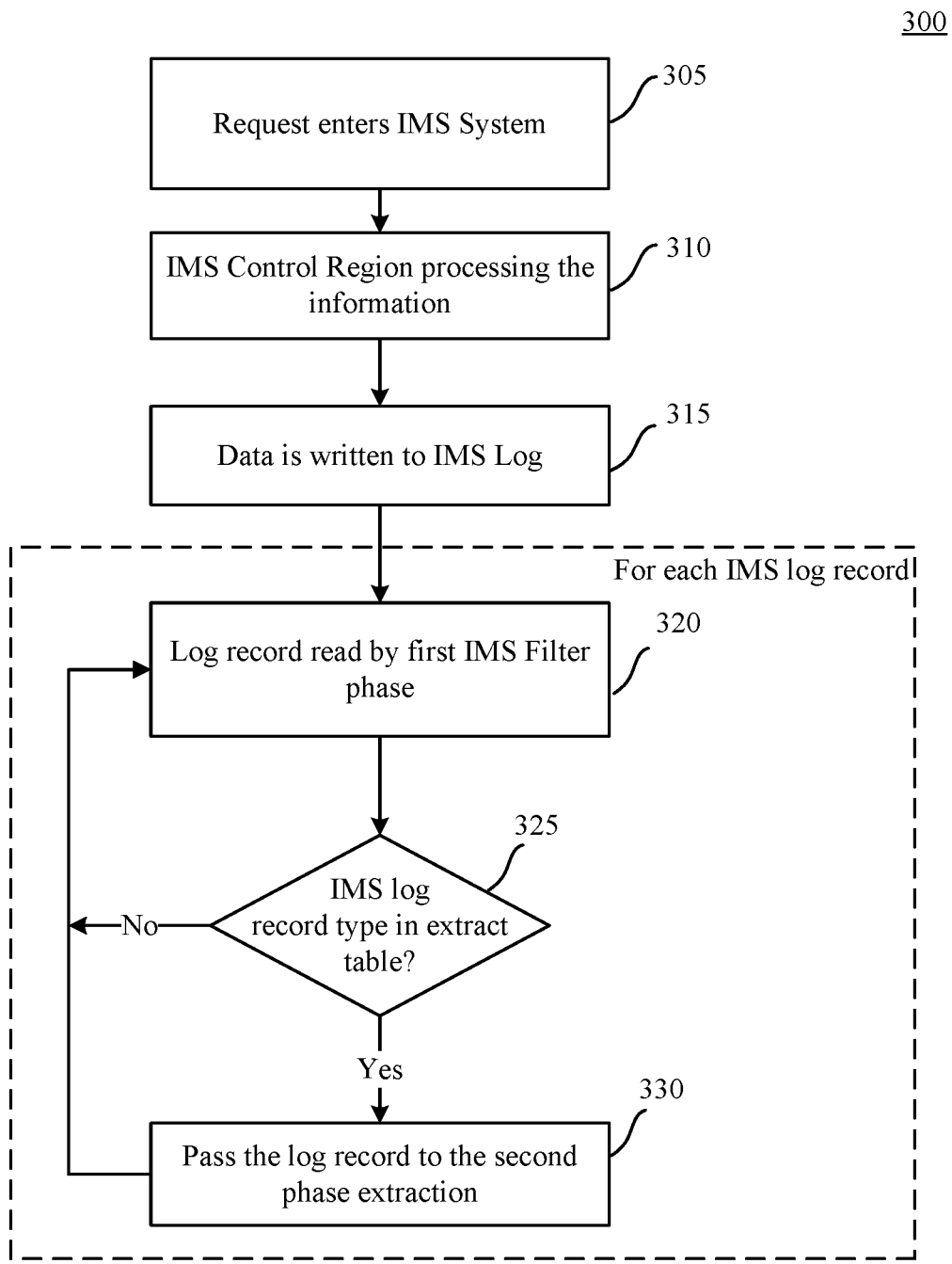
FIG. 3 is a flowchart illustrating a first phase of log extraction, according to an implementation.

FIG. 3 is a flowchart illustrating a first phase of a log extraction process 300, according to an implementation. In one implementation, process 300 may be repeatedly invoked during normal operation of a mainframe subsystem, e.g., an IMS subsystem. For example, process 300 may be executed in IMS control region 130 of FIG. 1 or FIG. 2. Process 300 performs as little data processing as possible to avoid adversely impacting the normal operations of the mainframe subsystem. For ease of discussion, the IMS subsystem is used as an example mainframe subsystem in FIG. 3. Implementations are not limited to IMS and the disclosed techniques can be used with other mainframe subsystems. In some implementations, during all or part of process 300, the system may collect and maintain certain statistics to monitor and evaluate the performance of the system.

At 305, a request for IMS services is received. The IMS control region processes the request (310). During processing, the system may generate one or more IMS log records (315). These log records are generated during the course of normal process for various system purposes, such as to keep track of work performed and ensure system integrity. The system may obtain each of the records written to the IMS log and submit them to first-phase filtering, represented by steps 320 to 330. It is understood that steps 320 to 330 are repeated for each record that is included in the IMS log. In some implementations, steps 320 to 330 may be performed as part of the IMS log write operation. In such implementations, the system intercepts the log write operation, which enables steps 320 to 330 to be performed without switching address modes and gives steps 320 to 330 access to IMS control blocks and other IMS constructs and internal functions. The system determines whether the log record has a log record type that matches one of the log record types in the extraction list (325). If the log record type matches one of the log record types in the extraction list (325, Yes), the log record passes the first phase extraction. In some implementations, determining whether the log record passes the first phase may include checking the log record type of the log record against an in-memory table of log record types. In some implementations, determining whether the log record passes the first phase may include checking the log record type of the log record against records in the extraction list. For some log record types, determining whether the log record passes the first phase may include determining whether a log record subtype matches a subtype in the extraction list and/or memory table generated from the extraction list.

If the log record does not pass the first filter (325, No), the system proceeds to the next log record (e.g., step 320). If the log record does pass the first filter (325, Yes), the system passes the record to the second phase (330). In some implementations, this may include writing the log record to a buffer. In some implementations, this may include writing the log record to a shared memory space. In some implementations, this may include adding the log record to a queue. The system then continues processing the next log record (e.g., step 320). In some implementations, the system may monitor the size of a buffer and, when the buffer is full, copy the buffer to an address space accessible by a second phase extraction and start writing to a new buffer. In some implementations, this step is optional.

In some implementations, process 300 runs continuously while the IMS subsystem is operational. In some implementations, the filtering portion of process 300 (e.g., steps 320 to 330) can be suspended. In some implementations, suspension can be implicit and result from an empty in-memory table or extraction list. In some implementations, suspension can be explicit, e.g., suspension of the IMS control region extractor 220 of FIG. 2.

Figure 4:
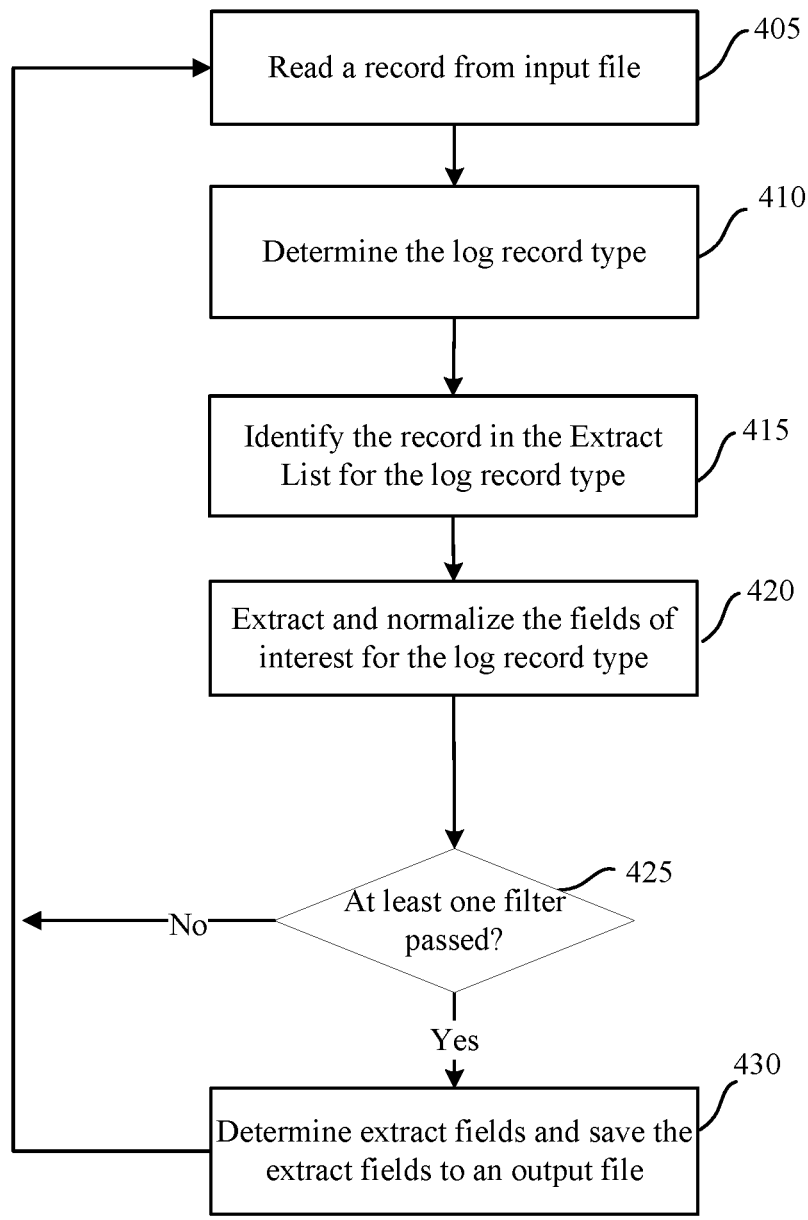
FIG. 4 is a flowchart illustrating a second phase of log extraction, according to an implementation.

FIG. 4 is a flowchart illustrating a second phase of a log extraction process 400, according to an implementation. Process 400 is illustrated for a single input log record, i.e., a log record that passed the first phase. It is understood that a system, such as log data extractor 150 of FIG. 1 or FIG. 2, performs process 400 for all log records that pass the first phase. Process 400 performs more extensive filtering and extraction on the log records that passed the first phase. Moreover, process 400 runs outside of the address space of the mainframe subsystem that produced the log records. Thus, the second phase processing of process 400 does not add any overhead to the mainframe subsystem. For ease of discussion, the IMS subsystem is used as an example mainframe subsystem in FIG. 4. Implementations are not limited to IMS and the disclosed techniques can be used with other mainframe subsystems.

At 405, a record is read from the input file (405). The input file is generated as part of step 330 of FIG. 3 and can take any of a number of forms, e.g., a buffer of a specific size, a queue, a file in a shared address space, etc. The record read from the input file is referred to as the input record. Thus, input record is understood to refer to a log record that passed the first phase.

In some implementations, the system may use a linked list format to process input records. In such implementations the linked list may be referred to as a field block chain. Each block in the field block chain represents a different field of interest from the input record. In some implementations, a block in the field block chain can include a pointer to the next field block, a pointer to the previous field block, the log type of the record, a name of the field of interest, a type of the field of interest, a length of the field of interest; and/or a value of the field of interest. However, implementations are not limited to the linked list format and can be performed using other methods of tracking fields of interest. In implementations using a linked list, the system initializes the field block chain, e.g., starting out with an empty list. The system determines the log record type of the input record (410). For IMS log records, the log record type is a one-byte code at the beginning of the log record. The system compares this one-byte code to the extraction list to determine the fields of interest (415). The extraction list includes, for each log record type that passes the first phase, identification of one or more fields. Each of the one or more fields is identified as an extract field, as a field in a filter element, or both. The fields identified as an extract field or used in a filter element are fields of interest. Thus, to determine the fields of interest, the system locates the record in the extraction list with a matching log record type and identifies the extract fields and fields in the filter elements for that log record type.

The system extracts and normalizes the fields of interest (420). In some implementations, the system may use a data to field mapping to assist in extraction and normalization. As indicated above, some log records have variable fields with a location that changes and is dependent on the value of other fields in the record. Some fields are static and always in the same location. The system extracts the field value from the input record. Before it is stored, the system may normalize the field value. Normalization converts the field value from the input record into a predefined format. For example, integers may be converted from a variety of formats (e.g., single-byte binary, decimal, character) to a common format. As another example, dates may be saved in a common format. In some implementations, where the field of interest is a converted field, extraction and normalization may include extracting two or more fields from the input record, evaluating the values of these fields, and determining the value of the field of interest based on the evaluation. For example, a field A may be a field of interest and is defined as having a value of Y or N. Whether field A has a Y value or an N value may depend on the values of three other fields, e.g., field M, field N, and field P. In some implementations, the system may store the extracted and normalized field value, e.g., as a block in the field block chain. In some implementations, all normalized field values are character values, which aids in the conversion from EBCDIC to ASCII.

Once all fields of interest are extracted and normalized, the system may determine whether at least one filter element is passed (425). This secondary filter is applied in the second phase. This step is optional and only performed when the extraction file record has at least one filter element. If the extraction file record lacks a filter element, the secondary filter is passed automatically and processing continues at 430. A filter element includes a comparison operation performed against a filter field and a comparison value. The comparison operation, filter field, and comparison value are selected by a user. The comparison value can include special/meta characters, such as * and %, that represent wildcard matches. When the comparison resolves to TRUE, the comparison operation is passed.

In some implementations, a filter element can include two or more comparison operations. For example, a filter element can include a first comparison operator applied to a first filter field and first comparison value and a second comparison operation applied to a second filter field and a second comparison value. The first filter field and second filter field can be the same field or different fields. When more than one comparison operation is included in a filter element, the filter element evaluates to TRUE when all comparison operations evaluate to TRUE. In some implementations, the log type record in the extraction file may include two or more filter elements. When the record has two or more filter elements, if any one filter element evaluates to TRUE, the filter is passed. In other words, in extraction list records, filter elements are disjunctive, but comparison operations within a particular filter element are conjunctive.

If at least one filter element exists, but no filter elements pass (425, No), the input record is ignored/discarded. In other words, the secondary filter fails and the system does not perform any further processing for the input record and a next input record is read (405). If at least one filter element passes (or if there are no filter elements), (425, Yes), the system writes information for the extract fields to an output file (430). For example, the system may traverse the fields of interest and write information for fields that are extract fields to the output file. As indicated earlier, writing the information to an output file may include transmitting the information for the extract fields directly to another system, via TCP/IP for example. The output file may include other information, such as the log record type. The format of the output file is implementation-dependent and can take a number of forms. Because the extract fields depend on user-selection (e.g., via the user interface) and log record type, the output file may include name-value pairs, e.g., in a JSON or XML format. However, implementations are not limited to name-value pairs and can be implemented using other methods. After writing a record to the output file the system then continues processing the next record, if one exists, at 405. In some implementations, process 400 occurs periodically. For example, process 400 may be initiated when a buffer is closed. In some implementations, process 400 occurs continuously. In some implementations, process 400 occurs in a batch mode, e.g., at a scheduled time.

FIGS. 5 to 10 illustrate example user interfaces used to populate an extraction list used in the first phase and the second phase of log extraction, according to an implementation. The example user interfaces of FIGS. 5 to 10 are non-limiting and meant to show the type of information provided in generating an extraction list. However, the example information may include additional information not shown and/or different information than the information illustrated. The data collected by the example user interfaces may be examples of the extractor user interface 154 used to build extraction list 152 of FIG. 1 and FIG. 2.

FIG. 5 illustrates an interface 500 for selecting log record types 510 that are included in an extraction list 505. In this example, the extraction list 505 has an identifier of "Test". In this example, three log record types are selected for inclusion in the list 505. The example interface 500 includes a description of the log record type and an indication of the number of extract fields 515 and filter elements 520 for each log record type. In the example of FIG. 5, the log record type "03" lacks a filter element and therefore does not have any filter fields. In this case all log records with log record type "03" will pass the second filter phase. FIG. 6 illustrates an interface 600 listing some of the log record types that can be added to an extraction list. Once a user selects a log record type from interface 600, it is added to those illustrated in user interface 500 of FIG. 5.

FIG. 7 illustrates an interface 700 listing extract fields 715 for a particular log record type 710 of a particular extract list 705. The user interface 700 illustrates the five extract fields for log record type '03', e.g., as indicated in FIG. 5. Thus, for example, interface 700 may result from selection of record type '03' of FIG. 5 for extract field viewing/editing. In the example of FIG. 7, the type and length of each extract field is provided. The type and length represent the normalized format of the field. FIG. 8 illustrates an example interface 800 for adding extract fields, according to an implementation. The fields listed in user interface 800 are fields that exist in the particular log record type 710, e.g., record type '03' of FIG. 7.

FIG. 9 illustrates an interface 900 listing comparison operations for a particular log record 910 of extraction list 905. The user interface 900 illustrates the one filter element for log record type '16', e.g., as indicated in FIG. 5. Thus, for example, interface 900 may result from selection of log record type '16' of FIG. 5 for filter viewing/editing. In the example of FIG. 9, the filter fields 915, the comparison operator 920, and the comparison value 925 of each filter operation in the filter element are displayed. In other words, the filter element illustrated in interface 900 includes three comparison operations, each with a respective filter field 915, comparison operator 920, and comparison value 925. In some implementations, the filter element may be given an identifier 930. FIG. 10 illustrates an example interface 1000 for adding or editing a comparison operation of a filter element, according to an implementation.

Implementations of the various techniques described herein may be implemented in digital electronic circuitry, or in computer hardware, firmware, software, or in combinations of them. Implementations may be implemented as a computer program product, i.e., a computer program tangibly embodied in a machine-readable storage device (e.g., a tangible computer-readable medium that does not include a propagating signal), for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers, such as a storage device, suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks, but do not include transitory propagating signals. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a mainframe or data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

According to one aspect, a mainframe computing system includes at least one processor, an extraction list identifying a plurality of IMS log record types and, for each log record type, fields of interest including at least one extract field, an IMS subsystem executing in an IMS control region on the mainframe computing system, the IMS subsystem generating log records while processing IMS message requests, an IMS control region extractor configured to identify IMS log records matching one of the plurality of IMS log record types in the extraction list and write the identified IMS log records to a file, the IMS control region extractor executing in the IMS control region, and a log data extractor executing in an address space separate from the IMS control region. The log data extractor may be configured to read the IMS log records in the file, each record read being an input record. For each input record, the log data extractor may be configured to identify fields of interest in the extraction list for the log record type of the input record, extract the fields of interest from the input record (the fields of interest including at least one extract field), convert the fields of interest to a predefined format, and write the at least one extract field to an output file. The output file may be transmitted to an analysis engine and used as input to the analysis engine.

These and other aspects can include one or more of the following, alone or in combination. For example, the fields of interest may include the at least one extract field and at least one filter element. As another example, the fields of interest may include the at least one extract field and at least two field elements, each filter element respectively including at least one filter field. In some implementations, the log data extractor may be further configured to, for each input record: evaluate each filter element to determine whether the filter element passes and write the at least one extract field to the output file responsive to determining that at least one filter element of the at least two filter elements passes. In some implementations, determining that a filter element passes includes determining that each comparison operation in the filter element is true, wherein if a comparison operation in the filter element is not true, the filter element does not pass. As another example, the log types identified in the extraction list may be stored in an in-memory table used by the IMS control region extractor. As another example, for at least one log record type, the extraction list includes a subtype, and the IMS control region extractor is configured to write the IMS log records matching the at least one log record type to the buffer responsive to determining that the log records match the subtype type. As another example, the system may also include a data to field mapping extracting the fields of interest from the input record may use the data to field mapping to identify the field in the input record. In some implementations, the data to field mapping includes, for fields that are converted to an integer, an indication of whether the field in the log record is a single-byte binary, a half-word binary, a full-word binary, a packed decimal, or a character. In some implementations, the data to field mapping includes, for at least one field, instructions for determining a value for the field based on evaluation of at least two other fields in the input record. As another example, the system may also include a user interface configured to obtain, from a user, data with which to populate the extract list.

According to one aspect, a method includes writing IMS log records matching log types identified in an extraction list to a file within an IMS control region of a mainframe computer and outside of the IMS control region, reading records from the file. For each record read, the method may also include extracting fields of interest from the record based on fields of interest associated with the log type of the log record in the extraction list and a data-to-field mapping for the log type, converting the fields of interest to a predetermined format based on the data-to-field mapping, and writing at least one field of interest to an output file. The method may also include transmitting the output file to an analytics engine for processing.

These and other aspects can include one or more of the following, alone or in combination. For example, the log types identified in the extraction list may be stored in an in-memory table in the IMS control region and the table may be used to determine which IMS log records to write to the file. As another example, the fields of interest for a first log type can include at least one filter field in at least one filter element, the filter element can include a comparison operation applying a comparison operator to the at least one filter field and a comparison value, and the method may also include, for each record read that matches the first log type, determining whether the comparison operation passes and writing the at least one field of interest to the output file responsive to determining the comparison operation passes. As another example, the comparison operation may be a first comparison operation and the filter element may include a second comparison operation applying a second comparison operator to a second filter field and the method may also include, for each record read that matches the first log type, determining whether at least one of the first comparison operation and the second comparison operation passes, and writing the at least one field of interest to the output file responsive to determining that at least one of the first comparison operation and the second comparison operation passes. As another example, each record in the output file may be at least an order of magnitude smaller than the log record from which the record was extracted. As another example, extracting the fields of interest may include generating a linked list of fields, each block in the linked list including a pointer to the next field block, a pointer to the previous field block, a name of the field of interest, and a value of the field of interest. In some implementations, the fields of interest include filter fields and extract fields and writing the at least one field of interest to the output file includes removing, from the linked list, each block that is not an extract field and using the linked list to write fields to the output file. As another example the method may also include collecting statistics during identification of IMS log records in the IMS control region and providing the statistics for display to a user to monitor and evaluate impact on the IMS control region. As another example, the method may also include intercepting an IMS log write operation, wherein writing the IMS log records matching the log types identified in the extraction file occurs during the IMS log write operation as a result of the intercepting.

According to one aspect, a mainframe system includes at least one processor, an IMS subsystem executing on the mainframe system, the IMS subsystem writing log records in response to handling requests, and an IMS extractor executing on the mainframe system. The IMS extractor is configured to identify IMS log records matching log record types in an in-memory table and passing matching log records to a log data extractor executing on the mainframe system, the in-memory table being populated from an extraction list that identifies log record types and, for each log record type, one or more fields of interest. The system also includes the log data extractor, which is configured to receiving records from the IMS extractor and, for each record received, extract the fields of interest from the record based on the log type and the extraction list and write at least some of the fields of interest to an output file, wherein the output file is transmitted to an analysis engine and used as input. The system also includes a user interface configured to populate the extraction list by enabling selection of a log record type, enabling selection of at least one field for the selected log record type, and enabling selection of filter criteria for the selected log record type. The selections may be recorded in the extraction list and addition of a new log record type to the extraction list may initiate an update of the in-memory table.

These and other aspects can include one or more of the following, alone or in combination. For example, the IMS extractor may also identify the IMS log records matching the log record types in the in-memory table as the IMS log records are written. As another example, the IMS extractor may intercept the writing of log records at a point where the IMS subsystem is in a 64-bit processing mode and the identifying and passing occur in the 64-bit processing mode.

According to one aspect, a computer-implemented method includes, within an IMS control region of an IMS subsystem, intercepting IMS log write operations and writing, as part of the intercepted IMS log write operations, IMS log records matching log types identified in an extraction list to a shared memory buffer, the shared memory buffer being shared with an address space outside the IMS control region. The method may also include, in the address space outside of the IMS control region, reading records from the buffer and, for each record read, extracting fields of interest from the record based on fields of interest associated with the log type of the log record in the extraction list, converting the fields of interest to a predetermined format, and writing at least one field of interest to an output file. The method may also include transmitting the output file to an analytics engine for processing.

These and other aspects can include one or more of the following, alone or in combination. For example, the intercepting may occur while the IMS log write operation is in a 64-bit processing mode. As another example, determining whether an IMS log record matches a log type identified in the extraction list can include determining whether a log type of the IMS log record is included in an in-memory table of log types extracted from the extraction list.

In one general aspect, a computer program product being tangibly embodied on a computer-readable storage device stores instructions that, when executed by at least one processor causes a computer system to perform any of the disclosed methods or operations.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A mainframe computing system comprising:
   at least one processor;
   an extraction list identifying a plurality of IMS log record types and, for each log record type, fields of interest including at least one extract field;
   an IMS subsystem executing in an IMS control region on the mainframe computing system, the IMS subsystem generating log records while processing IMS message requests;
   an IMS control region extractor configured to identify IMS log records matching one of the plurality of IMS log record types in the extraction list and write the identified IMS log records to a file, the IMS control region extractor executing in the IMS control region in a first phase of a dual-phase extraction;
   a log data extractor executing in an address space separate from the IMS control region in a second phase of the dual-phase extraction, the log data extractor configured to:
      read the IMS log records in the file, each record read being an input record, and for each input record:
         identify fields of interest in the extraction list for the log record type of the input record,
         extract the fields of interest from the input record, the fields of interest including at least one extract field,
         convert the fields of interest to a predefined format, and
         write the at least one extract field to an output file, wherein the output file is transmitted to an analysis engine and used as input to the analysis engine.

2. The mainframe computing system of claim 1, wherein the fields of interest include the at least one extract field and at least one filter element.

3. The mainframe computing system of claim 1, wherein the fields of interest include the at least one extract field and at least two filter elements, each filter element respectively including at least one filter field.

4. The mainframe computing system of claim 3, wherein the log data extractor is further configured to, for each input record:
   evaluate each filter element to determine whether the filter element passes, and
   write the at least one extract field to the output file responsive to determining that at least one filter element of the at least two filter elements passes.

5. The mainframe computing system of claim 4, wherein determining that a filter element passes includes determining that each comparison operation in the filter element is true, wherein if a comparison operation in the filter element is not true the filter element does not pass.

6. The mainframe computing system of claim 1, wherein the log types identified in the extraction list are stored in an in-memory table used by the IMS control region extractor.

7. The mainframe computing system of claim 1, wherein for at least one log record type, the extraction list includes a subtype, and the IMS control region extractor is configured to write the IMS log records matching the at least one log record type to a buffer responsive to determining that the log records match the subtype type.

8. The mainframe computing system of claim 1, further comprising a data to field mapping and wherein extracting the fields of interest from the input record uses the data to field mapping to identify the field in the input record.

9. The mainframe computing system of claim 8, wherein the data to field mapping includes, for at least one field, instructions for determining a value for the field based on evaluation of at least two other fields in the input record.

10. The mainframe computing system of claim 1, further including a user interface configured to obtain, from a user, data with which to populate the extract list.

11. A computer-implemented method comprising:
   within an IMS control region of a mainframe computer in a first phase of a dual-phase extraction, writing IMS log records matching log types identified in an extraction list to a file;
   outside of the IS control region in a second phase of the dual-phase extraction, reading records from the file and, for each record read:
      extracting fields of interest from the record based on fields of interest associated with the log type of the log record in the extraction list and a data-to-field mapping for the log type,
      converting the fields of interest to a predetermined format based on the data-to-field mapping, and
      writing at least one field of interest to an output file; and
   transmitting the output file to an analytics engine for processing.

12. The method of claim 11, further comprises: intercepting an IMS log write operation, wherein as a result of the intercepting, writing the IMS log records matching the log types identified in the extraction file occurs during the IMS log write operation.

13. The method of claim 11, wherein the log types identified in the extraction list are stored in an in-memory table in the IS control region and the table is used to determine which IS log records to write to the file.

14. The method of claim 11, wherein the fields of interest for a first log type include at least one filter field in at least one filter element, the filter element including a comparison operation applying a comparison operator to the at least one filter field and to a comparison value, and the method further comprises, for each record read that matches the first log type:
  determining whether the comparison operation passes; and
  responsive to determining the comparison operation passes, writing the at least one field of interest to the output file.

15. The method of claim 14, wherein the comparison operation is a first comparison operation, and the filter element includes a second comparison operation applying a second comparison operator to a second filter field, and the method further comprises, for each record read that matches the first log type:
  determining whether at least one of the first comparison operation and the second comparison operation passes; and
  responsive to determining that at least one of the first comparison operation and the second comparison operation passes, writing the at least one field of interest to the output file.

16. The method of claim 11, wherein each record in the output file is at least an order of magnitude smaller than the log record from which the record was extracted.

17. The method of claim 11, wherein extracting the fields of interest includes generating a linked list of fields, each block in the linked list including:
  a pointer to the next field block;
  a pointer to the previous field block;
  a name of the field of interest; and
  a value of the field of interest.

18. The method of claim 17, wherein the fields of interest include filter fields and extract fields and writing the at least one field of interest to the output file includes:
  removing, from the linked list, each block that is not an extract field; and
  using the linked list to write fields to the output file.

19. The method of claim 11, further comprising:
  collecting statistics during identification of IMS log records in the IMS control region; and
  providing the statistics for display to a user to monitor and evaluate impact on the IMS control region.

20. A computer-implemented method comprising:
  within an IMS control region of an IMS subsystem in a first phase of a dual-phase extraction:
    intercepting IMS log write operations, and
    writing, as part of the intercepted IMS log write operations, IMS log records matching log types identified in an extraction list to a shared memory buffer, the shared memory buffer being shared with an address space outside the IS control region;
  in the address space outside of the IS control region in a second phase of the dual-phase extraction, reading records from the buffer and, for each record read:
    extracting fields of interest from the record based on fields of interest associated with the log type of the log record in the extraction list,
    converting the fields of interest to a predetermined format, and
    writing at least one field of interest to an output file; and
  transmitting the output file to an analytics engine for processing.

21. The method of claim 20, wherein the intercepting occurs while the IMS log write operation is in a 64-bit processing mode.

22. The method of claim 20, wherein writing the IMS log records matching log types identified in the extraction list to the shared memory buffer includes:
  determining whether a log type of the IMS log record is included in an in-memory table of log types extracted from the extraction list.

\* \* \* \* \*

UNITED STATES PATENT AND TRADEMARK OFFICE
CERTIFICATE OF CORRECTION

| | | |
|---|---|---|
| PATENT NO. | : 12,130,830 B1 | Page 1 of 1 |
| APPLICATION NO. | : 16/352161 | |
| DATED | : October 29, 2024 | |
| INVENTOR(S) | : Caldwell, Jr. et al. | |

It is certified that error appears in the above-identified patent and that said Letters Patent is hereby corrected as shown below:

In the Claims

In Column 22, Claim 11, Lines 47, delete "IS" and insert -- IMS --, therefor.

In Column 22, Claim 13, Lines 66, delete "IS" and insert -- IMS --, therefor.

In Column 22, Claim 13, Lines 67, delete "IS" and insert -- IMS --, therefor.

In Column 24, Claim 20, Lines 17, delete "IS" and insert -- IMS --, therefor.

In Column 24, Claim 20, Lines 18, delete "IS" and insert -- IMS --, therefor.

Signed and Sealed this
Seventeenth Day of December, 2024

Derrick Brent
*Acting Director of the United States Patent and Trademark Office*